(12) United States Patent
Mehrara et al.

(10) Patent No.: US 9,229,717 B2
(45) Date of Patent: Jan. 5, 2016

(54) REGISTER ALLOCATION FOR CLUSTERED MULTI-LEVEL REGISTER FILES

(71) Applicant: NVIDIA Corporation, Santa Clara, CA (US)

(72) Inventors: Mojtaba Mehrara, San Francisco, CA (US); Gregory Diamos, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/710,909

(22) Filed: Dec. 11, 2012

(65) Prior Publication Data

US 2014/0164745 A1    Jun. 12, 2014

(51) Int. Cl.
*G06F 9/45* (2006.01)
*G06F 9/30* (2006.01)
*G06F 9/38* (2006.01)

(52) U.S. Cl.
CPC .......... *G06F 9/30098* (2013.01); *G06F 9/3012* (2013.01); *G06F 9/30138* (2013.01); *G06F 9/3891* (2013.01)

(58) Field of Classification Search
None
See application file for complete search history.

(56) References Cited

U.S. PATENT DOCUMENTS

| 8,448,157 | B2* | 5/2013 | Mitran et al. ................. 717/151 |
| 2004/0255109 | A1* | 12/2004 | Nakajima ......................... 713/1 |
| 2005/0278707 | A1* | 12/2005 | Guilford ....................... 717/130 |
| 2007/0074196 | A1* | 3/2007 | Ogawa et al. .................. 717/160 |
| 2007/0168581 | A1* | 7/2007 | Klein et al. ...................... 710/31 |
| 2010/0037037 | A1* | 2/2010 | Lee et al. ....................... 712/205 |
| 2011/0107068 | A1 | 5/2011 | Mitran et al. |
| 2012/0242673 | A1* | 9/2012 | Udayakumaran ............. 345/522 |

FOREIGN PATENT DOCUMENTS

TW    201342240 A    11/2013

OTHER PUBLICATIONS

Jang et al. "A Code Generation Framework for VLIW Architectures with Partitioned Register Banks," Proceedings of 3rd. Int. Conf. on Massively Parallel Computing Systems, Apr. 1998, 8 pages.
Hoogerbrugge et al. "Instruction Scheduling for TriMedia," The Journal of Instruction-Level Parallelism—JILP, vol. 1, http://www.jilp.org, 1999, pp. 1-21.
Kailas et al. "CARS: A New Code Generation Framework for Clustered ILP Processors," HPCA '01 Proceedings of the 7th International Symposium on High-Performance Computer Architecture, IEEE Computer Society Washington, DC, USA, ISBN: 0-7695-1019-1, © 2001, pp. 133-143.

(Continued)

*Primary Examiner* — Don Wong
*Assistant Examiner* — Daxin Wu
(74) *Attorney, Agent, or Firm* — Artegis Law Group, LLP

(57) ABSTRACT

A method for allocating registers within a processing unit. A compiler assigns a plurality of instructions to a plurality of processing clusters. Each instruction is configured to access a first virtual register within a live range. The compiler determines which processing cluster in the plurality of processing clusters is an owner cluster for the first virtual register within the live range. The compiler configures a first instruction included in the plurality of instructions to access a first global virtual register.

21 Claims, 14 Drawing Sheets

(56) References Cited

OTHER PUBLICATIONS

Terechko et al. "Cluster Assignment of Global Values for Clustered VLIW Processors," CASES '03 Proceedings of the 2003 International Conference on Compilers, Architecture and Synthesis for Embedded Systems, ACM New York, NY, USA, ISBN: 1-58113-676-5, © 2003, pp. 32-40.

Lin et al. "PALF: Compiler Supports for Irregular Register Files in Clustered VLIW DSP Processors," Concurrency and Computation: Practice & Experience—Current Trends in Compilers for Parallel Computers (CPC2006), John Wiley and Sons Ltd. Chichester, UK, vol. 19 Issue 18, Dec. 2007, pp. 2391-2406.

Lu et al. "LC-GRFA: global register file assignment with local consciousness for VLIW DSP processors with non-uniform register files," Concurrency and Computation: Practice & Experience—Compilers for Parallel Computers 2007 Workshop (CPC 2007), John Wiley and Sons Ltd. Chichester, UK, vol. 21 Issue 1, Jan. 2009, pp. 101-114.

Gebhart et al., "A Compile-Time Managed Multi-Level Register File Hierarchy," MICRO-44 '11, Proceedings of the 44th Annual IEEE/ACM International Symposium on Microarchitecture, 2011, pp. 465-476.

* cited by examiner

US 9,229,717 B2

REGISTER ALLOCATION FOR CLUSTERED MULTI-LEVEL REGISTER FILES

BACKGROUND OF THE INVENTION

1. Field of the Invention

The present invention generally relates to parallel computing and, more specifically, to register allocation for clustered multi-level register files.

2. Description of the Related Art

Computer processors oftentimes utilize register files as a scratch space for performing computations. Register files are typically configured for speed and are typically physically close to clusters of functional units that perform calculations. Some parallel processing systems having multiple clusters of functional units utilize a multiple level hierarchy of register files.

A multiple level hierarchy provides some register files at the bottom of the hierarchy ("low-level register files") that are physically close to the functional units and other register files at the top of the hierarchy ("high-level register files") that are physically farther from the functional units. Values in low-level register files require less time and energy to access than values in high-level register files. For simplicity of design and for speed, low-level register files may be accessible only to a single cluster of functional units, while high-level register files may be accessible to a larger number of clusters of functional units.

While values may be stored in low-level register files to reduce energy consumption and for speed, values stored in low-level register files may be needed by multiple clusters that do not necessarily have direct access to the low-level register files in which the values are stored. Therefore, techniques are generally used to ensure that values that are needed by multiple clusters of functional units are actually available to all of those multiple clusters of functional units.

Some current techniques for making values available to more than one cluster of functional units ensure that all values that are utilized by multiple clusters of functional units are stored in high-level register files to allow more than one cluster of functional units to access the values. While storing values utilized by multiple functional units in a high-level register file helps to ensure that values needed by multiple clusters of functional units are accessible to those multiple clusters of functional units, accessing high-level register files requires more time and energy than accessing low-level register files. Further, some values that are used by multiple clusters of functional units are used primarily by a single cluster of functional units, with some ancillary accesses made by other clusters of functional units.

Therefore, one drawback of techniques in which all values utilized by multiple clusters of functional units are stored in high-level register files is that, although values utilized primarily by a single cluster of functional units may have only a few ancillary accesses by other functional units, the values used primarily by the single functional unit are stored in high-level register files. As high-level register files have higher access energy and higher access time than low-level register files, employing techniques in which all values utilized by multiple clusters of functional units are stored in high-level register files may miss opportunities for optimization in terms of reduction of access time and access energy.

As the foregoing illustrates, what is needed in the art is a technique for improving the utilization of a multiple level register file hierarchy by multiple clusters of functional units.

SUMMARY OF THE INVENTION

One embodiment of the present invention sets forth a method for allocating registers within a processing unit. A compiler assigns a plurality of instructions to a plurality of processing clusters. Each instruction is configured to access a first virtual register within a live range. The compiler determines which processing cluster in the plurality of processing clusters is an owner cluster for the first virtual register within the live range. The compiler configures a first instruction included in the plurality of instructions to access a first global virtual register.

One advantage of the disclosed technique is that the disclosed technique can configure instructions that access registers in a multiple-level register file hierarchy such that registers that are accessed often can be allocated to physical registers in a local register file.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
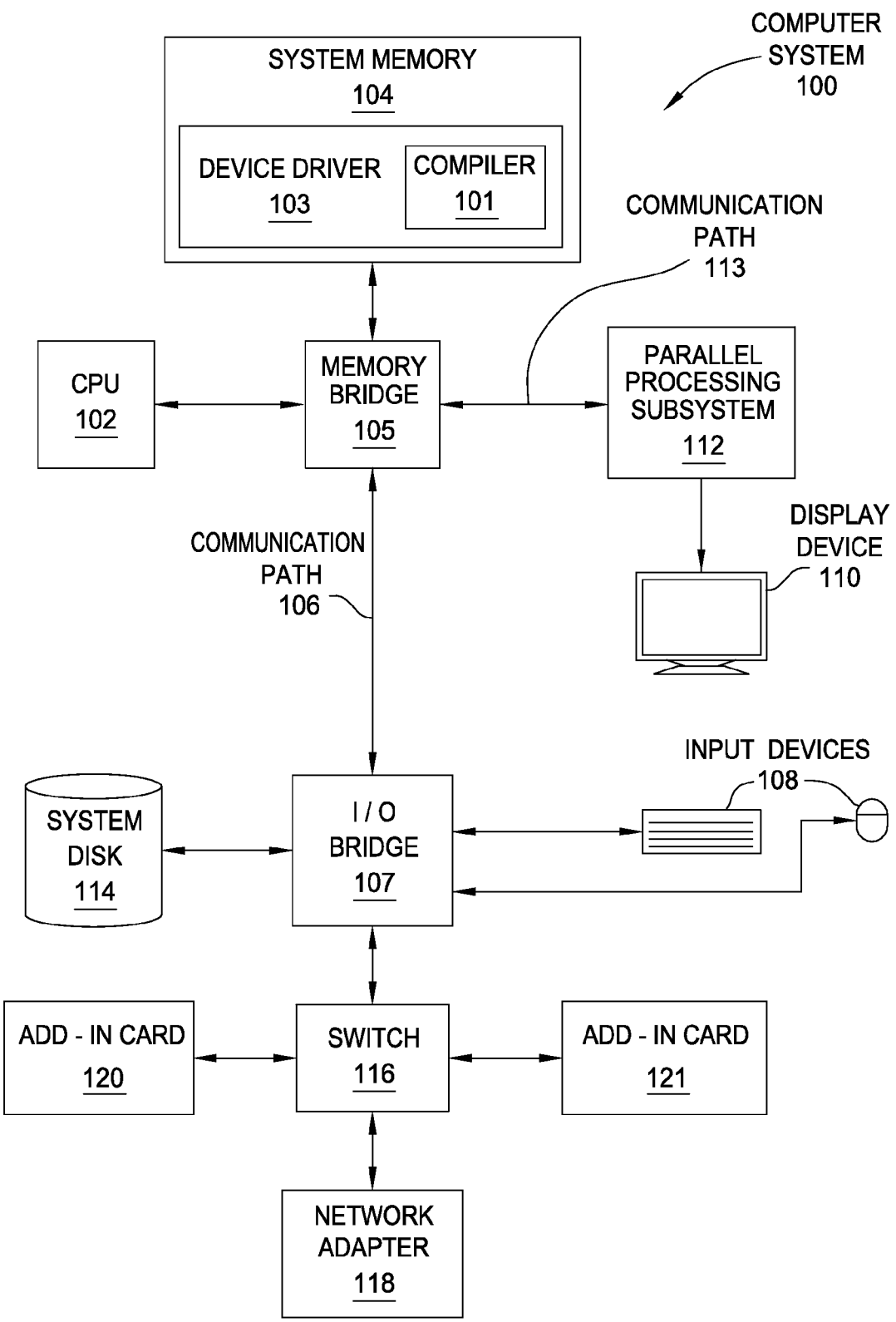
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link). In one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

A compiler 101 may be embedded within device driver 103. Compiler 101 compiles program instructions as needed for execution by parallel processing subsystem 112. During such compilation, compiler 101 may apply transforms to program instructions at various phases of compilation. In another embodiment of the present invention, compiler 101 may be a stand-alone application.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
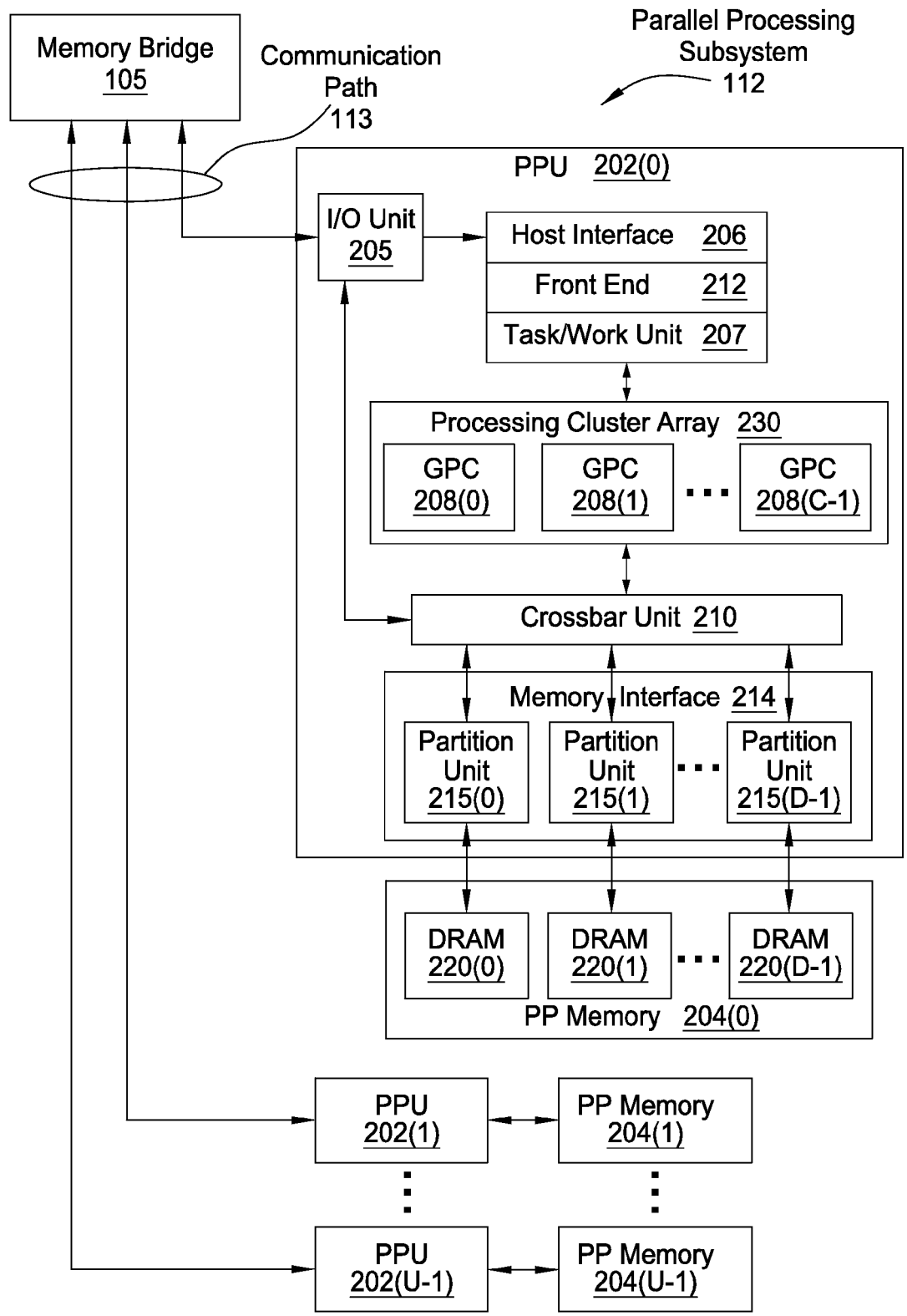
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have one or more dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) (not shown) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3:
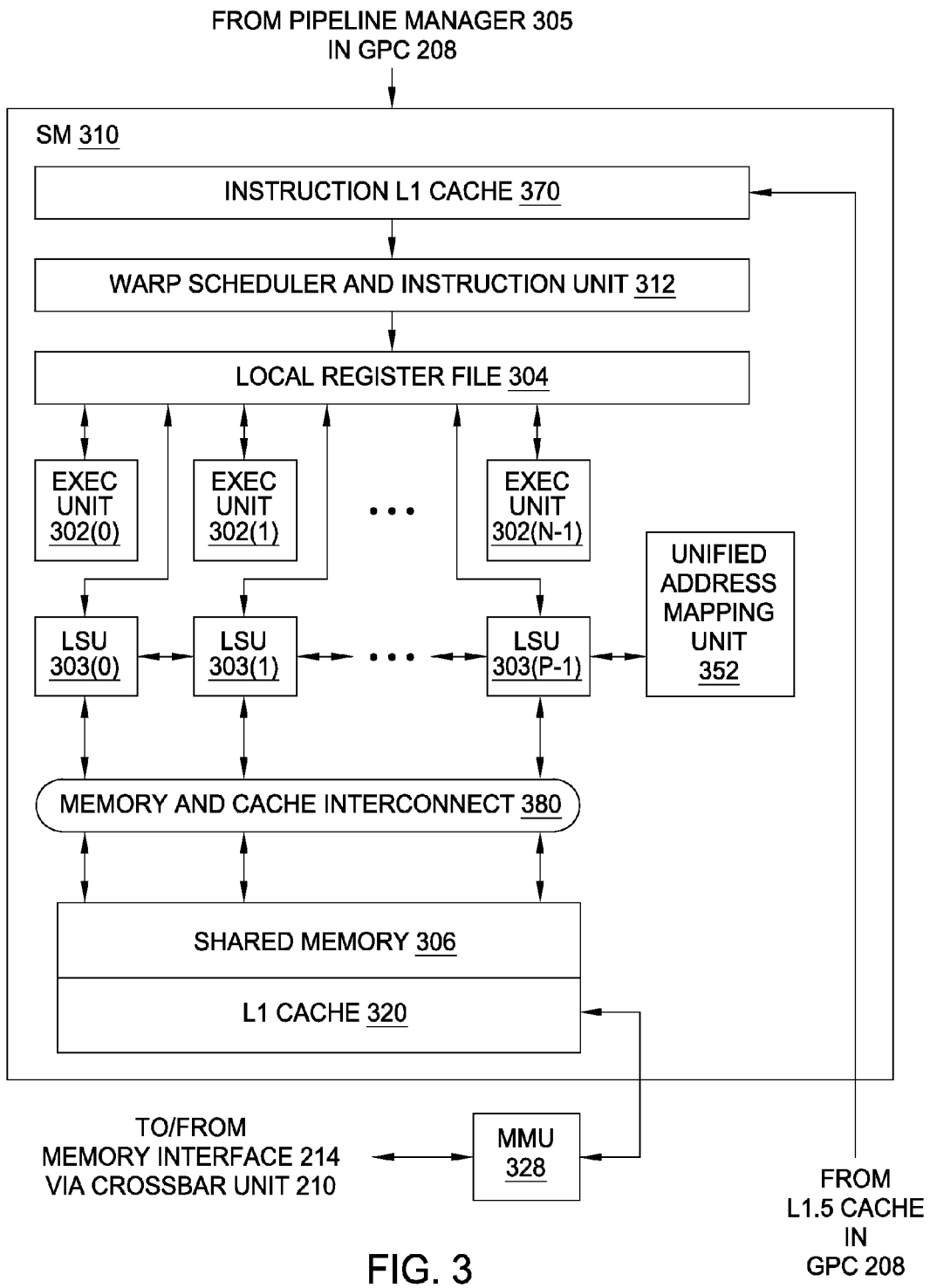
FIG. 3 is a block diagram of a portion of a streaming multiprocessor within the general processing cluster of FIG. 2, according to one embodiment of the present invention.

FIG. 3 is a block diagram of a streaming multiprocessor (SM) 310 within a GPC 208 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager (not shown) that distributes processing tasks to one or more streaming multiprocessors (SMs) 310, where each SM 310 configured to process one or more thread groups. Each SM 310 includes an instruction L1 cache 370 that is configured to receive instructions and constants from memory via an L1.5 cache (not shown) within the GPC 208. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303. The SM functional units may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that a system that, in a GPC 208 that includes $\underline{M}$ streaming multiprocessors 310, up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD (or by all LSUs 303) that store a CTA identifier, the CTA dimensions, the dimensions of a grid to which the CTA belongs (or queue position if the TMD encodes a queue task instead of a grid task), and an identifier of the TMD to which the CTA is assigned.

If the TMD is a grid TMD, execution of the TMD causes a fixed number of CTAs to be launched and executed to process the fixed amount of data stored in the queue. The number of CTAs is specified as the product of the grid width, height, and depth. The fixed amount of data may be stored in the TMD or the TMD may store a pointer to the data that will be processed by the CTAs. The TMD also stores a starting address of the program that is executed by the CTAs.

If the TMD is a queue TMD, then a queue feature of the TMD is used, meaning that the amount of data to be processed is not necessarily fixed. Queue entries store data for processing by the CTAs assigned to the TMD. The queue entries may also represent a child task that is generated by another TMD during execution of a thread, thereby providing nested parallelism. Typically, execution of the thread, or CTA that includes the thread, is suspended until execution of the child task completes. The queue may be stored in the TMD or separately from the TMD, in which case the TMD stores a queue pointer to the queue. Advantageously, data generated by the child task may be written to the queue while the TMD representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 320 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

It will be appreciated that the core architecture described herein is illustrative and that variations and modifications are possible. Any number of processing units, e.g., SMs 310, may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1-3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Global Register Allocation for Clustered Multi-Level Register Files

Figure 4:
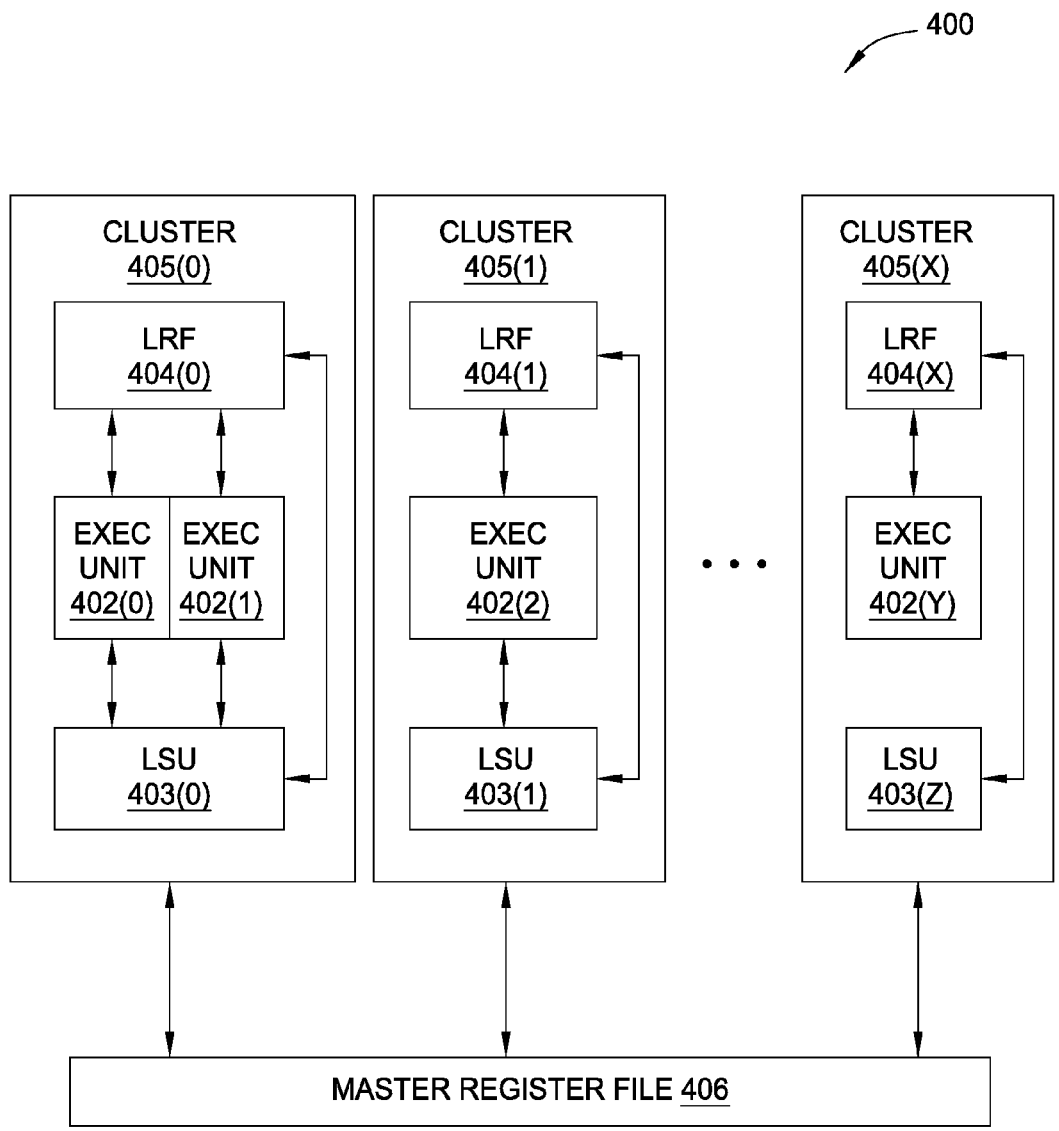
FIG. 4 is a block diagram of a multi-level register file hierarchy according to one embodiment of the present invention.

FIG. 4 is a block diagram of a multi-level register file hierarchy 400, according to one embodiment of the present invention. The multi-level register file hierarchy 400 is implemented by clusters 405 and master register file 406. The clusters 405 and master register file 406 may be included in SM 310 and may replace all or part of local register file 304, execution units 302, load-store units 403, and shared memory 306.

Each cluster 405 includes a dedicated local register file 404, one or more execution units 402, and may include a load-store unit 403. Multi-level register file hierarchy 400 includes X dedicated local register files 404, Y exec (execution or processing) units 402 and Z load-store units (LSU) 403. The execution units 402 may be pipelined, allowing a new instruction to be issued before a previous instruction has finished, as is known in the art. Any combination of execution units 402 may be provided. In one embodiment, the execution units 402 support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same execution unit 402 hardware can be leveraged to perform different operations.

All execution units 402 in a cluster have direct access to registers within the dedicated local register file 404 in the cluster 405, and do not have direct access to registers within dedicated local register files 404 in other clusters 405. Thus, the multi-level register file hierarchy 400 shown in FIG. 4, execution units 402(0) and 402(1) have direct access to registers in local register file 404(0) but do not have direct access to registers in local register file 404(1).

Preferably, dedicated local register file 404 has features that provide low access time and low access energy for registers in the dedicated local register file 404. One features that provides low access time and low access energy is small capacity. Additionally, dedicated local register file 404 may be located physically close to execution units 402 and/or load-store units 403 within the cluster, to reduce wire energy required to access registers within dedicated local register file 404.

A master register file 406 is present and is not included in any cluster 405. The master register file 406 includes registers that are accessible to all execution units 402 in all clusters 405. Further, the master register file 406 has features that provide greater capacity than the dedicated local register files 404.

Together, the master register file 406 and dedicated local register files 404 implement a multi-level register file hierarchy 400 in which high-level register files correspond to the master register file 406 and low-level register files correspond to the dedicated local register files 404. Due to the low access time, and low access energy of the dedicated local register files 404, values which are used frequently are advantageously stored in the dedicated local register files 404. Additional values that are used, though infrequently, may be stored in the master register file 406. Values that are used even less frequently may be stored in memory that is external to the multi-level register file hierarchy 400 such as L1 cache 320.

Values can be communicated between dedicated local register files 404 in clusters 405 indirectly through master register file 406. To communicate a value from a first dedicated local register file 404 in a first cluster 405 to a second dedicated local register file 404 in a second cluster, the value is copied from a register in the first local register file 404 into a register in the master register file 406, and then copied from the register in the master register file 406 to a register in the second local register file 404. As multiple instructions are utilized to communicate values between dedicated local register files 404 in clusters 405, it is beneficial to limit the number of times values are communicated from one dedicated register file 404 to another dedicated register file 404.

Execution units 402 are configured to execute instructions in a machine code. The machine code comprises a set of instructions for execution by execution units 402, where the instructions may access, without limitation, physical registers located in local register files 404 or master register file 406. Compiler 101 (in FIG. 1) accepts instructions in a virtual instruction set and translates the instructions in the virtual instruction set into instructions in the machine code. The virtual instruction set comprises a set of instructions that may access virtual registers. Virtual registers do not necessarily correspond to any particular physical register in local register files 404 or master register file 406. Instead, during translation, compiler 101 performs a series of steps for allocating the virtual registers to physical registers in local register files 404 or master register file 406.

Figure 5:
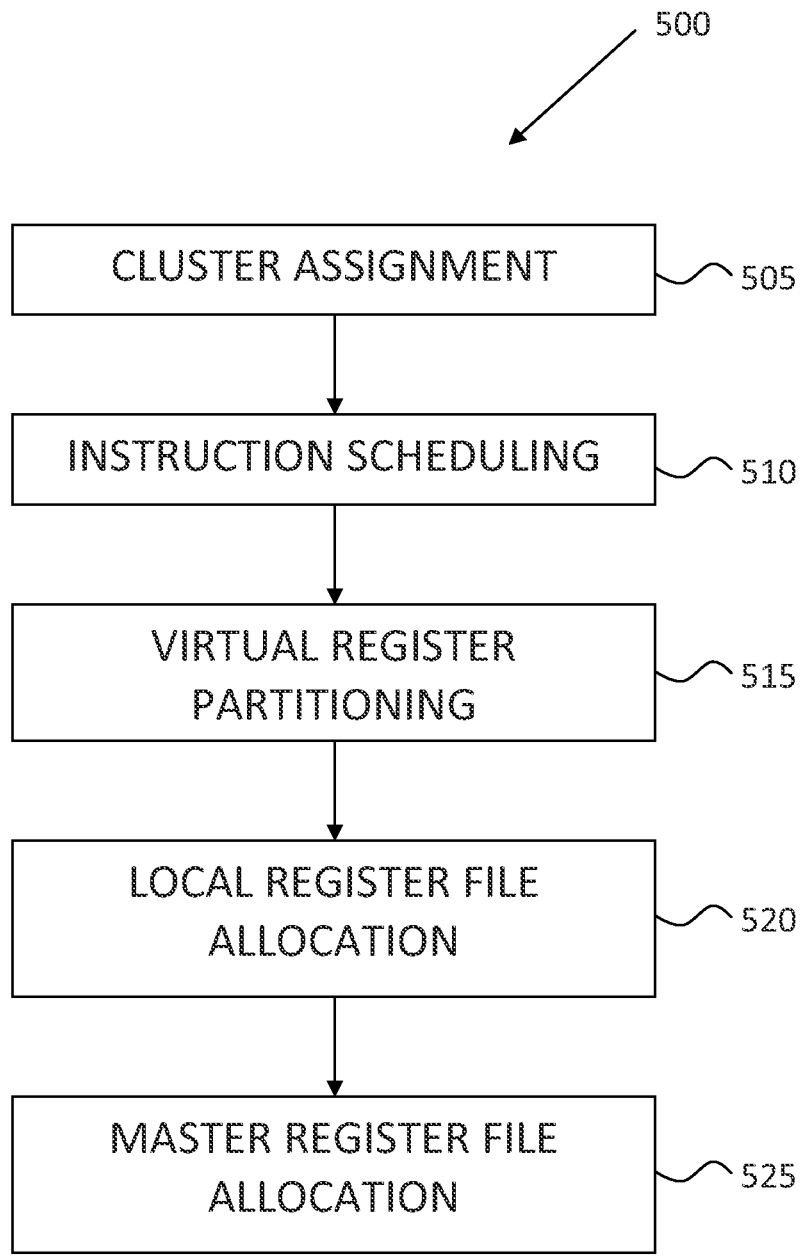
FIG. 5 sets forth a flow diagram of method steps for allocating virtual registers referenced by instructions in a virtual instruction set to physical registers, according to one embodiment of the present invention.

FIG. 5 sets forth a flow diagram of method steps for allocating virtual registers referenced by instructions in a virtual instruction set to physical registers, according to one embodiment of the present invention. Although the method steps are described in conjunction with FIGS. 1-4, persons skilled in the art will understand that any system configured to perform the method steps, in any order, falls within the scope of the present invention.

As shown, a method 500 begins in step 505, where compiler 101 performs cluster assignment. In cluster assignment, compiler 101 assigns instructions in the virtual instruction set to physical clusters 405. One example of an algorithm by which compiler 101 can perform cluster assignment is an algorithm known as the "Bottom-Up-Greedy" (BUG) algorithm, as is known. In step 510, compiler 101 performs instruction scheduling. In instruction scheduling, compiler 101 schedules the virtual instructions assigned in step 605, as is known. An example of an algorithm for performing instruction scheduling is "list scheduling."

In step 515, compiler 101 performs virtual register partitioning. In virtual register partitioning, compiler 101 performs a series of transforms that modify original instructions in the virtual instruction set that access virtual registers. The results of step 515 are modified instructions in the virtual instruction set that may reference different virtual registers than those referenced in the original instructions. Compiler 101 modifies the instructions that access virtual registers such that virtual registers can be allocated to physical registers in local register files 404 and in master register file 406. The different virtual registers in the modified instructions comprise two different types of virtual registers—local virtual registers, and global virtual registers. Local virtual registers correspond to physical registers in local register files 404 in clusters 405 and global virtual registers correspond to physical registers in master register file 406. Since local register files 404 in one cluster 405 are not directly accessible to another cluster 405, compiler 101 also inserts instructions for copying values between local virtual registers that correspond to different local register files 404 in different clusters 405. Step 515 is described in more detail with respect to FIGS. 6-14, below.

In step 520, compiler 101 performs local register file allocation. In local register file allocation, compiler 101 assigns local virtual registers to physical registers in local register files 404. To assign local virtual registers to physical registers in local register files 404, compiler 101 may utilize an algorithm known as "graph coloring" as is known. If there are insufficient physical registers in a local register file 404, compiler 101 can "spill" some virtual registers into the master register file 406.

In step 525, compiler 101 performs master register file allocation. In master register file allocation, compiler 101 assigns global virtual registers to physical registers in master register file 406. To assign global virtual registers to physical registers in master register file 406, compiler 101 may again utilize the graph coloring algorithm, as is known.

The descriptions of FIGS. 6-10 below contain references to a "new virtual register." A "new virtual register" is intended as a local virtual register in a non-owner cluster. If a virtual register is owned by a cluster, the value from that virtual register may be copied to the new virtual register so that the non-owner cluster is able to access it locally. FIGS. 6-14 make reference to the symbol "VRn", which indicates a "new virtual register."

The descriptions of FIGS. 6-10 below contain references to a "non-owner cluster." A "non-owner cluster" is a cluster to which an instruction that accesses (reads to or writes from) a virtual register is assigned, but that is not the owner cluster of the virtual register.

The descriptions of FIGS. 6-10 below contain references to a "corresponding global virtual register." "Corresponding global virtual registers" are utilized to communicate values between clusters. FIGS. 6-14 make reference to the symbol "MVR", which indicates a "corresponding global virtual register."

The descriptions of FIGS. 6-10 below also describe steps in which compiler 101 "inserts" instructions "before" or "after" instructions. The term "insert" describes a step in which compiler 101 modifies a consecutive set of instructions by adding an additional instruction in a particular location. Thus, when compiler 101 inserts a first instruction after a second instruction, compiler 101 creates the first instruction and places the first instruction after the second instruction in the consecutive set of instructions. Similarly, when compiler 101 inserts a first instruction before a second instruction, compiler 101 creates the first instruction and places the first instruction before the second instruction in the consecutive set of instructions.

Figure 6:
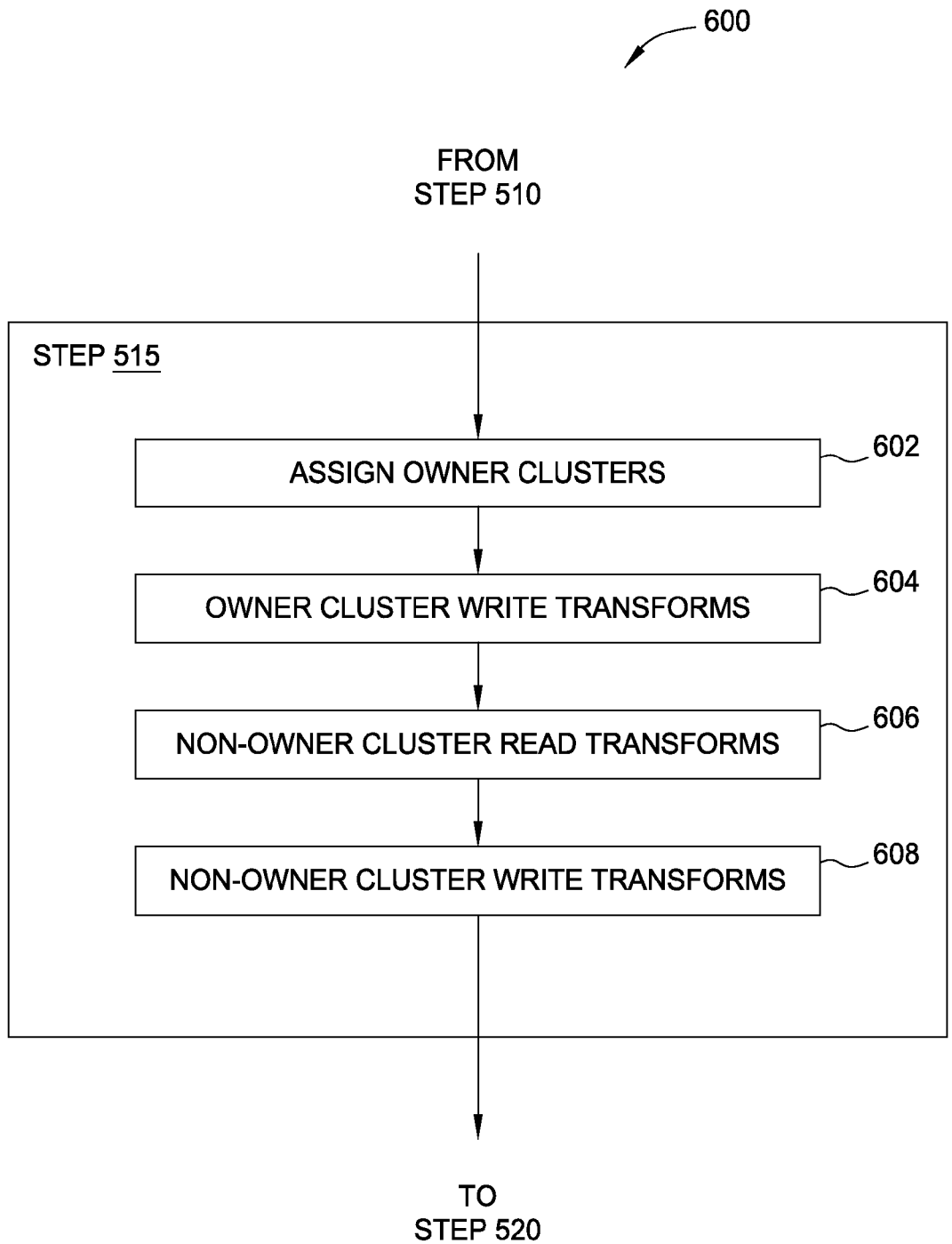
FIG. 6 sets forth a flow diagram of method steps for performing virtual register partitioning, according to one embodiment of the present invention.

FIG. 6 sets forth a flow diagram of method steps for performing virtual register partitioning, described in step 515 of FIG. 5, according to one embodiment of the present invention. Although the method steps are described in conjunction with FIGS. 1-4, persons skilled in the art will understand that any system configured to perform the method steps, in any order, falls within the scope of the present invention.

As shown, a method 600 begins in step 602, where compiler 101 assigns live ranges of virtual registers in the original instructions to owner clusters. A live range, as is known, comprises a range of accesses to a virtual register that begins with a write of a value to the virtual register and ends with the last read of the value from the virtual register before the next write to that virtual register. An owner cluster is a cluster 405 that is said to "own" a particular live range of a virtual register. The result of step 602 is a list of all virtual register live ranges and corresponding owner clusters.

In steps 604, 606, and 608, compiler 101 transforms original instructions that write to and read from virtual registers. Instructions that read from or write to virtual registers include, without limitation, any instructions that assign a value to (write) a virtual register or that read a value from (read) a virtual register, and could include, for example, arithmetic instructions that assign a result to a virtual register (write) as well as read a result from (read) a virtual register. A single instruction may both write to and read from virtual registers. Such an instruction is analyzed multiple times, once for each virtual register that is the subject of a read or write.

In step 604, compiler 101 transforms write instructions that are assigned to a cluster that is also the owner cluster of the virtual register to which the write instruction writes. In step 606, compiler 101 transforms read instructions that are assigned to a cluster that is not the owner cluster of the virtual register from which the read instruction reads. In step 608, compiler 101 transforms write instructions that are assigned to a cluster that is not the owner cluster of the virtual register to which the write instruction writes.

Figure 7:
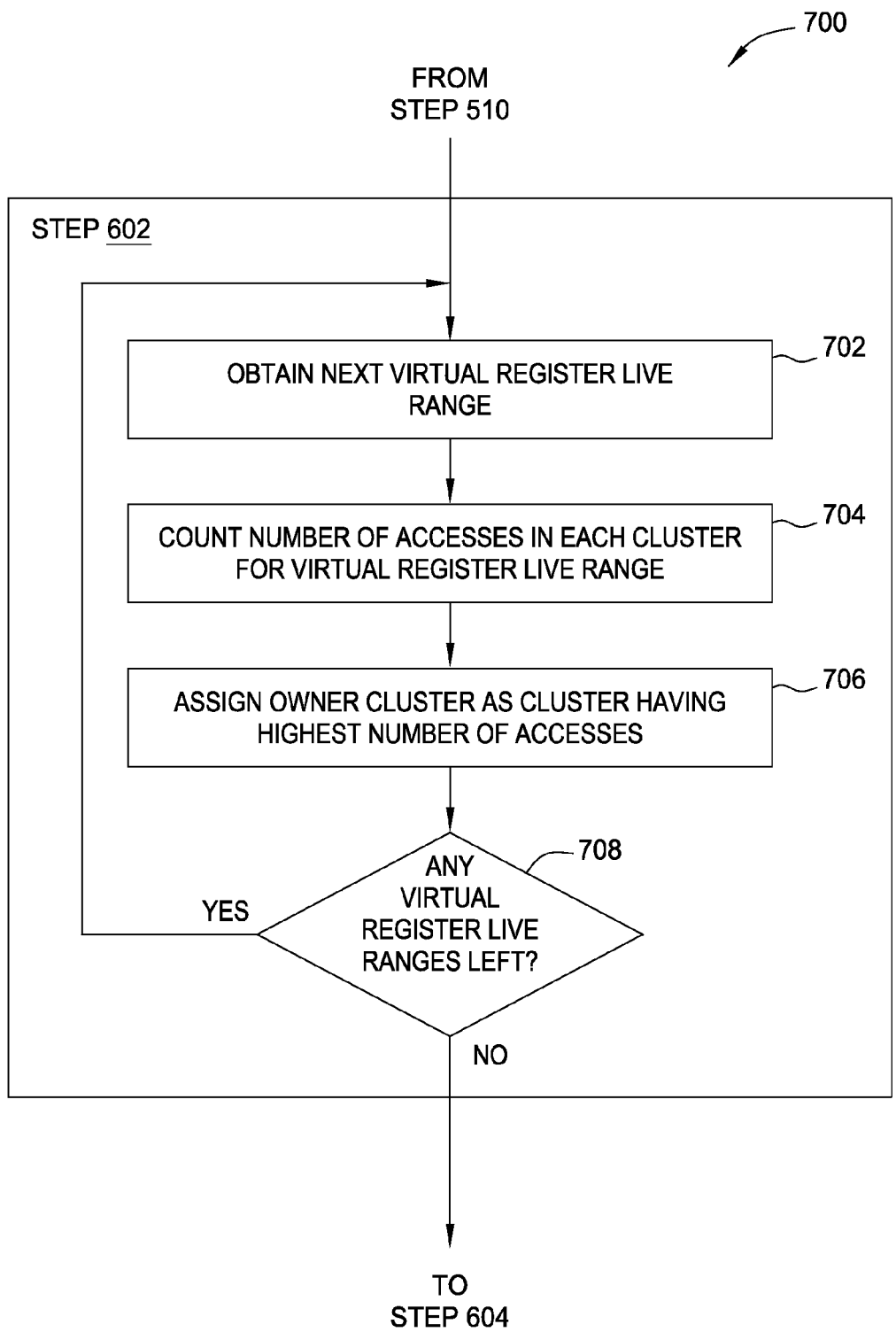
FIG. 7 sets forth a flow diagram of method steps for assigning owner clusters, according to one embodiment of the present invention.

FIG. 7 sets forth a flow diagram of method steps for assigning owner clusters, described in step 602 of FIG. 6, according to one embodiment of the present invention. Although the method steps are described in conjunction with FIGS. 1-4, persons skilled in the art will understand that any system configured to perform the method steps, in any order, falls within the scope of the present invention.

As shown, a method 700 begins in step 702, where compiler 101 obtains a next virtual register live range. As is known, a live range comprises a range of accesses to a virtual register that begins with a write of a value to the virtual register and ends with the last read of the value from the virtual register before the next write to that virtual register. A virtual register live range therefore comprises all instructions, assigned to any cluster 405, that access the virtual register in a particular live range. Virtual registers may have multiple live ranges. Therefore, because the flow diagram in FIG. 7 loops, step 702 may be performed multiple times for any given virtual register.

In step 704, compiler 101 counts the number of accesses by instructions assigned to each cluster 405 for the virtual register live range. In step 706, compiler 101 assigns an owner cluster to the virtual register live range as the cluster 405 to which the most instructions that access the virtual register live range are assigned. In step 708, compiler 101 checks to see if there are any virtual register live ranges left. If there are virtual register live ranges left, the method 700 loops back to step 702 again. If there are no virtual register live ranges left, the method 700 advances to step 604.

Figure 8:
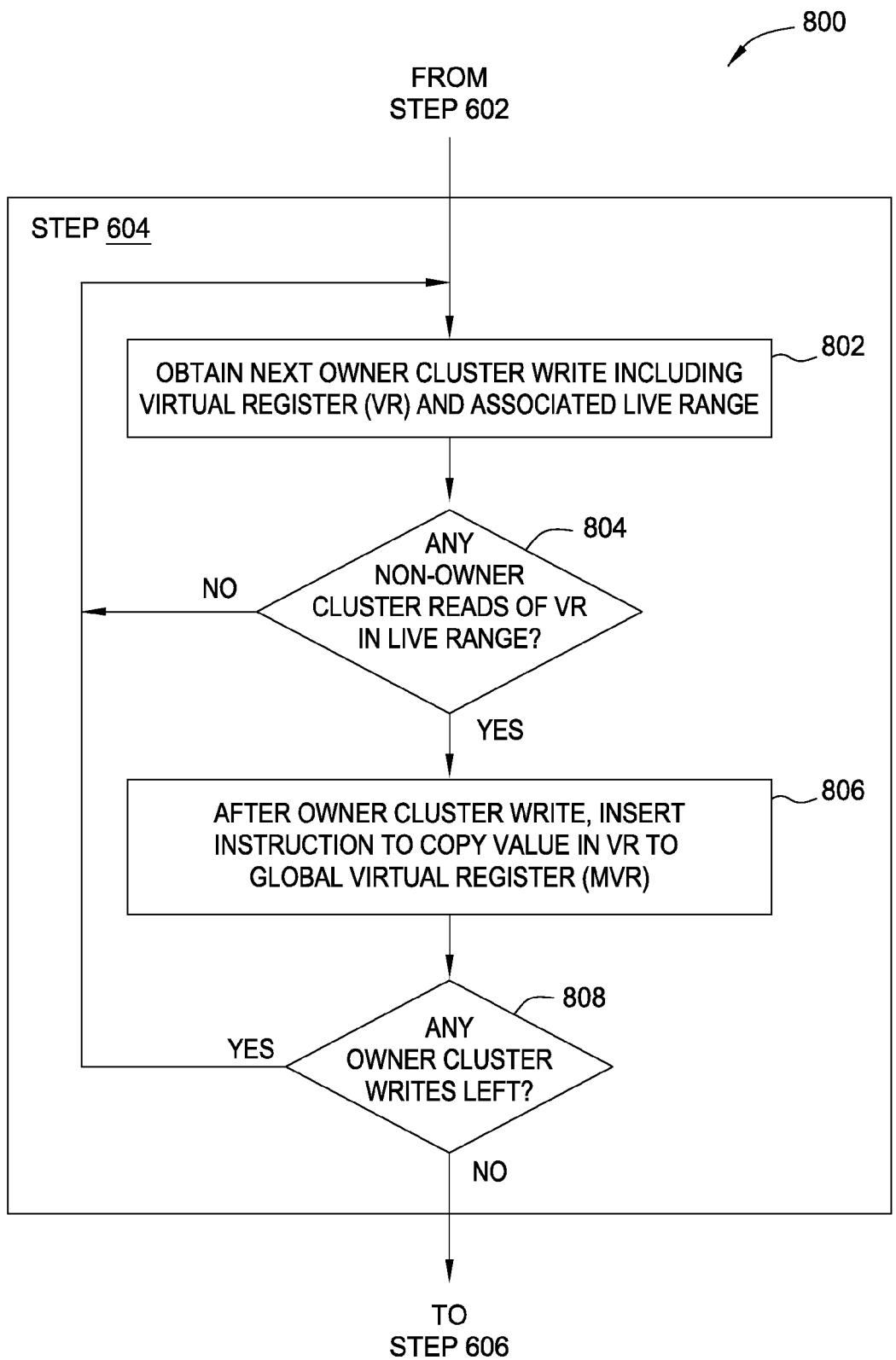
FIG. 8 sets forth a flow diagram of method steps for transforming owner cluster write operations, according to one embodiment of the present invention.

FIG. 8 sets forth a flow diagram of method steps for transforming owner cluster write operations, described in step 604 of FIG. 6, according to one embodiment of the present invention. Although the method steps are described in conjunction with FIGS. 1-4, persons skilled in the art will understand that any system configured to perform the method steps, in any order, falls within the scope of the present invention.

As shown, a method 800 begins in step 802, where compiler 101 obtains the next write instruction that is assigned to a cluster that is also the owner cluster of the virtual register to which the write instruction writes in a particular live range. In step 804, compiler 101 checks whether there are any non-owner cluster reads of the virtual register in the live range. In other words, compiler 101 checks whether there are any instructions assigned to a non-owner cluster of the virtual register in the live range, that read from the virtual register in the live range. If there are non-owner cluster reads of the virtual register in the live range, method 600 advances to step 806. If there are no non-owner cluster reads of the virtual register in the live range, method 600 loops back to step 802.

In step 806, compiler 101 inserts an instruction, after the write instruction, to copy the value in the virtual register to a global virtual register. The global virtual register is used to make the value in the virtual register available to clusters that are not owners of the virtual register in the live range.

In step 808, compiler 101 checks whether there are any more owner cluster writes left. In other words, compiler 101 checks whether there are any more instructions that are assigned to a cluster that is also the owner cluster of the virtual register to which the write instructions write in a particular live range. If there are any owner cluster writes left, the method 800 loops back to step 802. If there are no more owner cluster writes left, the method 800 proceeds to step 606.

Figure 9:
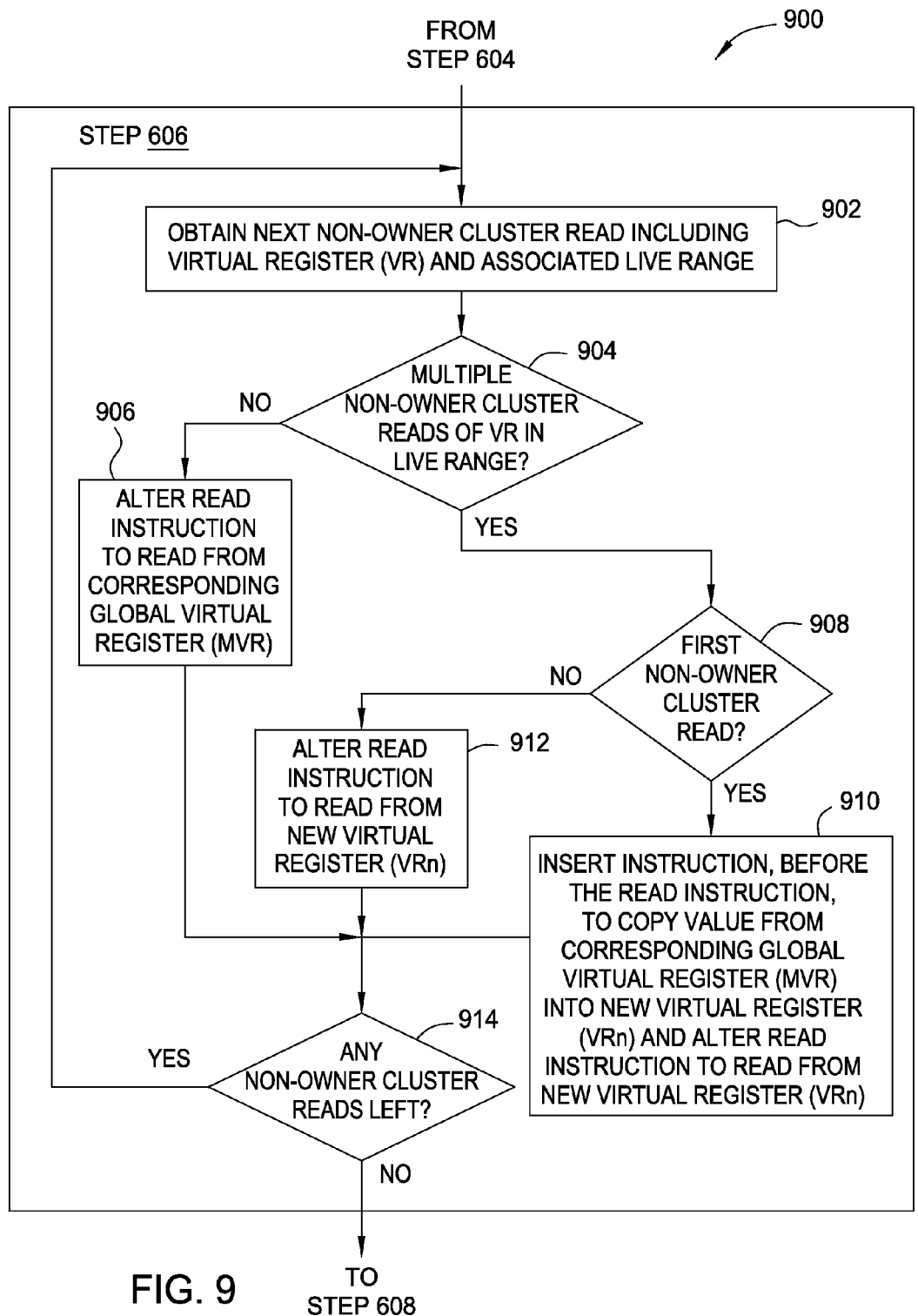
FIG. 9 sets forth a flow diagram of method steps for transforming non-owner cluster read operations, according to one embodiment of the present invention.

FIG. 9 sets forth a flow diagram of method steps for transforming non-owner cluster read operations, described in step 606 of FIG. 6, according to one embodiment of the present invention. Although the method steps are described in conjunction with FIGS. 1-4, persons skilled in the art will understand that any system configured to perform the method steps, in any order, falls within the scope of the present invention.

As shown, a method 900 begins in step 902, where compiler 101 obtains the next read instruction that is assigned to a cluster that is not the owner cluster of the virtual register from which the read instruction reads in a particular live range.

In step 904, compiler 101 checks whether there are multiple non-owner cluster reads of the virtual register in the live range. In other words, the compiler 101 checks whether there are multiple read instructions of the virtual register in the live range that are also assigned to the cluster to which the read instruction obtained in step 902 is assigned. If there are not multiple non-owner cluster reads of the virtual register in the live range, method 900 proceeds to step 906. If there are multiple non-owner cluster reads of the virtual register in the live range, method 900 proceeds to step 908.

In step 906, compiler 101 alters the read instruction obtained in step 902, such that instead of reading from the virtual register, the read instruction instead reads from a corresponding global register. The corresponding global register is the register that is the target of the instruction inserted by compiler 101 in step 806. As stated above with respect to step 806, the corresponding global register is used to make the value in the virtual register referred to in step 806 available to clusters that are not owners of that virtual register, such as the non-owner cluster referred to in step 902.

In step 908, compiler 101 checks whether the read instruction obtained in step 902 is the first read instruction assigned to its cluster. If the read instruction obtained in step 902 is the first read instruction assigned to its cluster, compiler 101 performs step 910. If the read instruction is not the first read instruction assigned to its cluster, compiler 101 performs step 912.

In step 910, compiler 101 inserts an instruction, before the read instruction, to copy the value from a corresponding global register into a new virtual register. Compiler 101 also alters the read instruction to read from the new virtual register, instead of the virtual register that the read instruction originally read from. The corresponding global register is the register that is the target of the instruction inserted by compiler 101 in step 806. As stated above with respect to step 806, the global register is used to make the value in the virtual register referred to in step 806 available to clusters that are not owners of that virtual register, such as the non-owner cluster referred to in step 902. In sum, in step 910, compiler 101 inserts instructions to bring a value from the global virtual register referred to in step 806 into a new local virtual register, and alters the read instruction to read from this local virtual register.

In step 912, compiler 101 alters the read instruction obtained in step 902 to read from a new virtual register, instead of the virtual register that the read instruction originally read from. The new virtual register is the new local virtual register referred to above with respect to step 910. Since step 606 is performed on all read instructions, including the first read instruction in a non-owner cluster, compiler 101 performs step 910 on the first read instruction in a non-owner cluster, and inserts an instruction to copy a value from a global virtual register to the new virtual register as described above with respect to step 910. This new virtual register is also the virtual register referred to in step 912.

After compiler 101 performs steps 906, 910 or 912, the method advances to step 914. In step 914, compiler 101 checks whether there are any non-owner cluster reads left. In other words, compiler 101 checks whether there are any read instructions left that are assigned to a cluster that is not the owner of the virtual register from which the instruction reads. If there are any non-owner cluster reads left, method 900 loops back to step 902. If there are no non-owner cluster reads left, method 900 advances to step 608.

Figure 10:
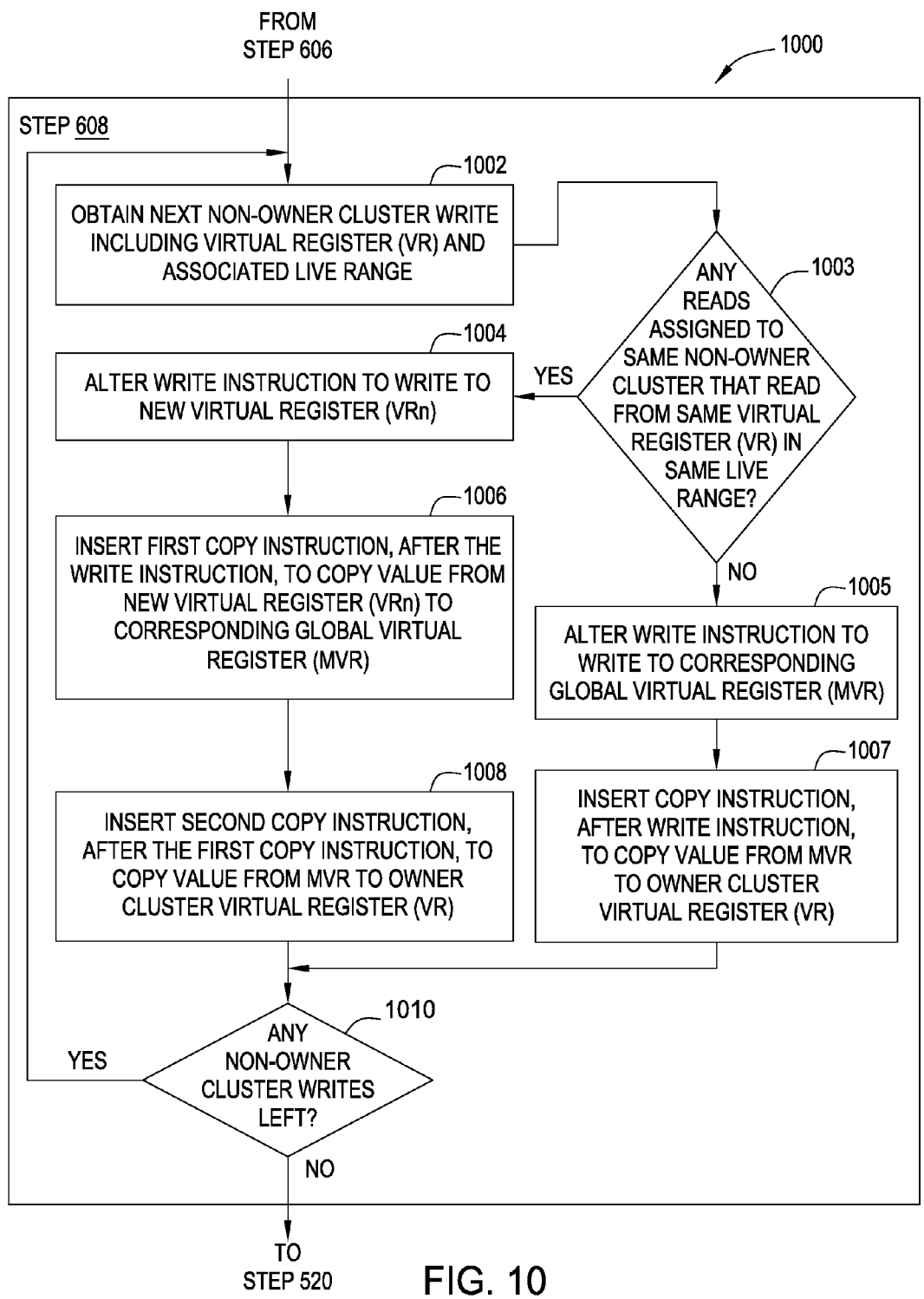
FIG. 10 sets forth a flow diagram of method steps for transforming non-owner cluster write operations, according to one embodiment of the present invention.

FIG. 10 sets forth a flow diagram of method steps for transforming non-owner cluster write operations, described in step 608 in FIG. 6, according to one embodiment of the present invention. Although the method steps are described in conjunction with FIGS. 1-4, persons skilled in the art will understand that any system configured to perform the method steps, in any order, falls within the scope of the present invention.

As shown, a method 1000 begins in step 1002, where compiler 101 obtains the next write instruction that is assigned to a cluster that is not the owner of the virtual register to which the write instruction writes, in a particular live range.

In step 1003, the compiler 101 checks whether there are any read instructions assigned to the same non-owner cluster that reads from the virtual register in the live range. If there are reads assigned to the same non-owner cluster that reads from the virtual register in the live range, the method proceeds to step 1004. If there are no reads assigned to the same non-owner cluster that reads from the virtual register in the live range, the method proceeds to step 1005.

In step 1004, compiler 101 alters the write instruction such that it writes to a new virtual register instead of the virtual register that it originally wrote to. In step 1006, compiler 101 inserts a first copy instruction, after the write instruction, that copies the value from the new virtual register to a corresponding global virtual register. In step 1008, compiler 101 inserts a second copy instruction, after the first copy instruction, to copy the value from the corresponding global virtual register, to the virtual register to which the write instruction obtained in step 1002 originally wrote.

In step 1005, compiler 101 alters the write instruction to write to a corresponding global virtual register. Next, in step 1007, compiler 101 inserts a copy instruction, after the write instruction, to copy the value from the corresponding global virtual register to the virtual register. By performing steps 1005 and 1007, the compiler copies the value written by the non-owner cluster back to the virtual register in the owner cluster. After performing steps 1008 or 1007, compiler 101 performs step 1010.

In step 1010, compiler 101 checks whether there are any more non-owner cluster writes left. In other words, compiler 101 checks whether there are any write instructions that are assigned to clusters that do not own the virtual register to which the write instruction writes. If there are non-owner cluster writes left, the method loops back to step 1002. If there are no non-owner cluster writes left, the method advances to step 520.

Figure 11:
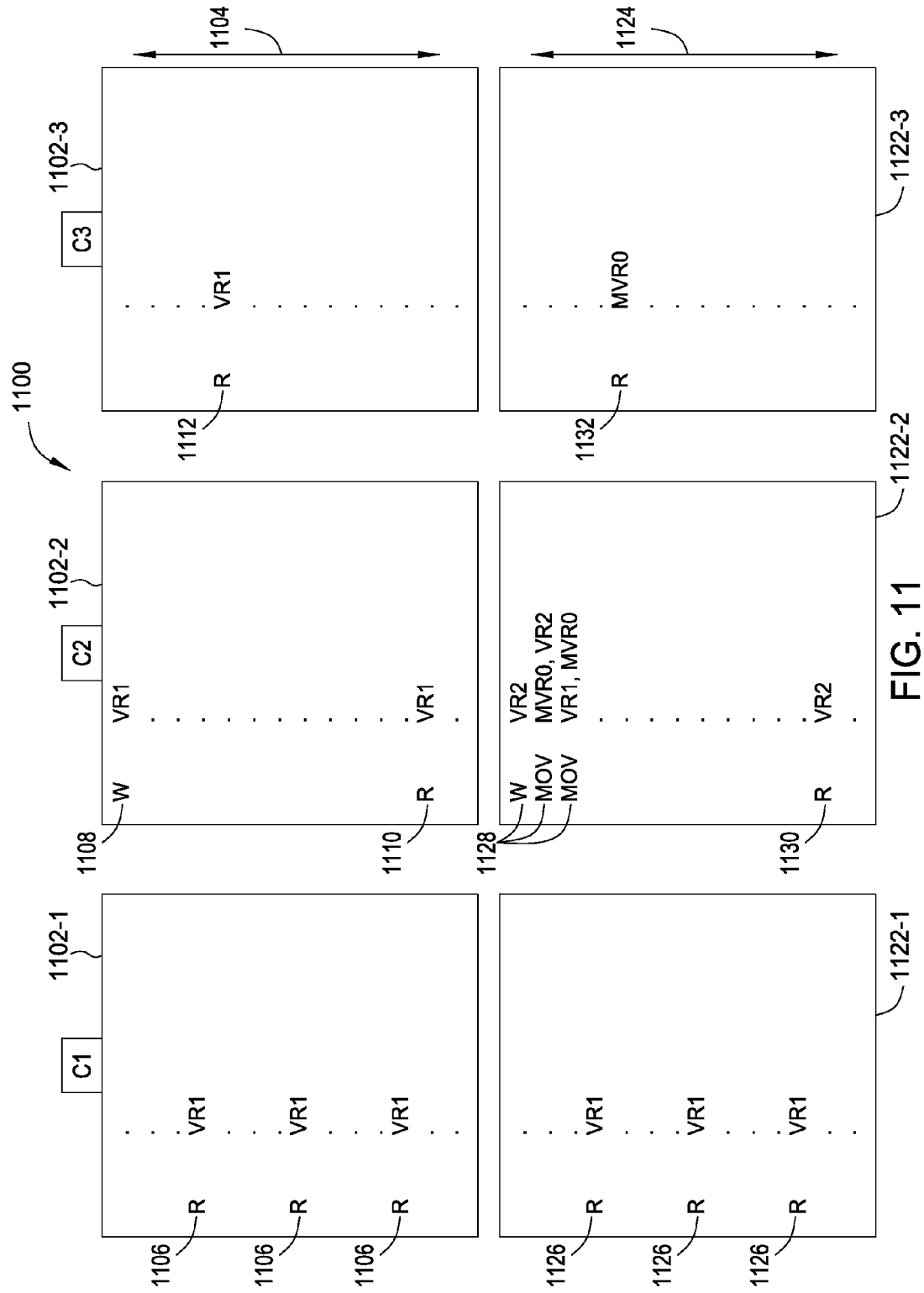
FIG. 11 is a block diagram depicting example code segments both before and after virtual register partitioning, according to one embodiment of the present invention.
Figure 12:
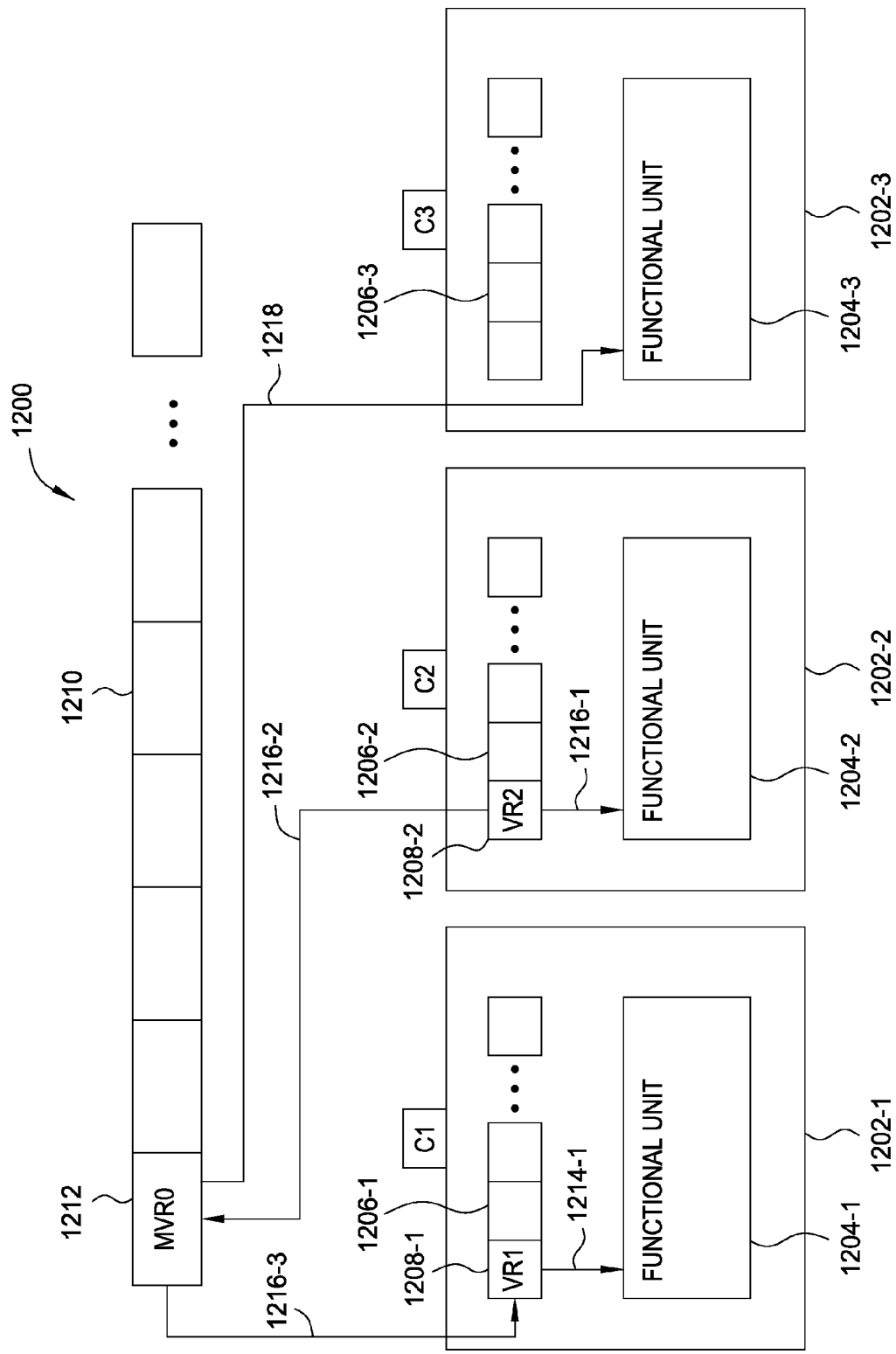
FIG. 12 is a block diagram of a multi-level register file hierarchy, according to one embodiment of the present invention.
Figure 13:
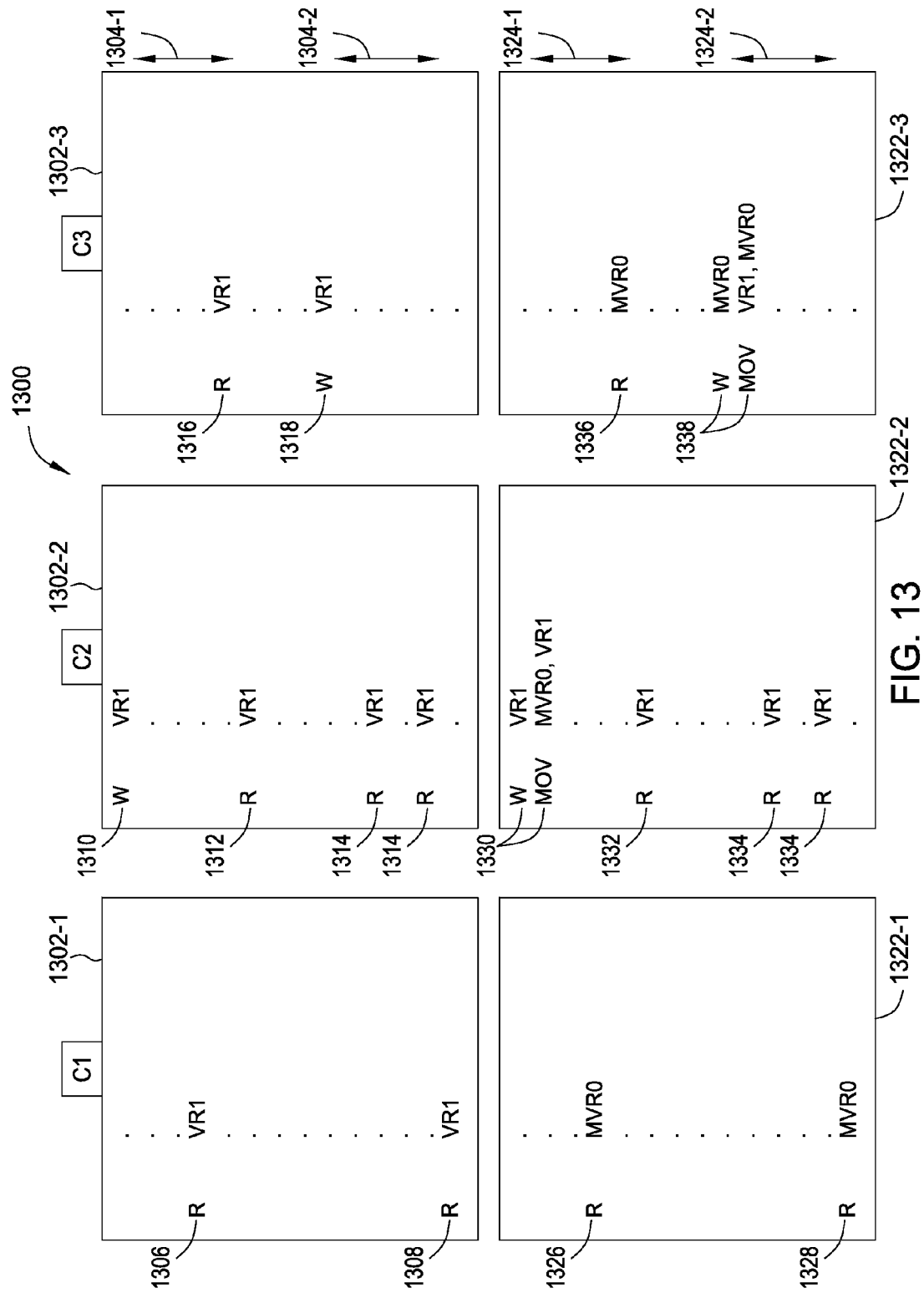
FIG. 13 is a block diagram depicting example code segments both before and after virtual register partitioning, according to one embodiment of the present invention.
Figure 14:
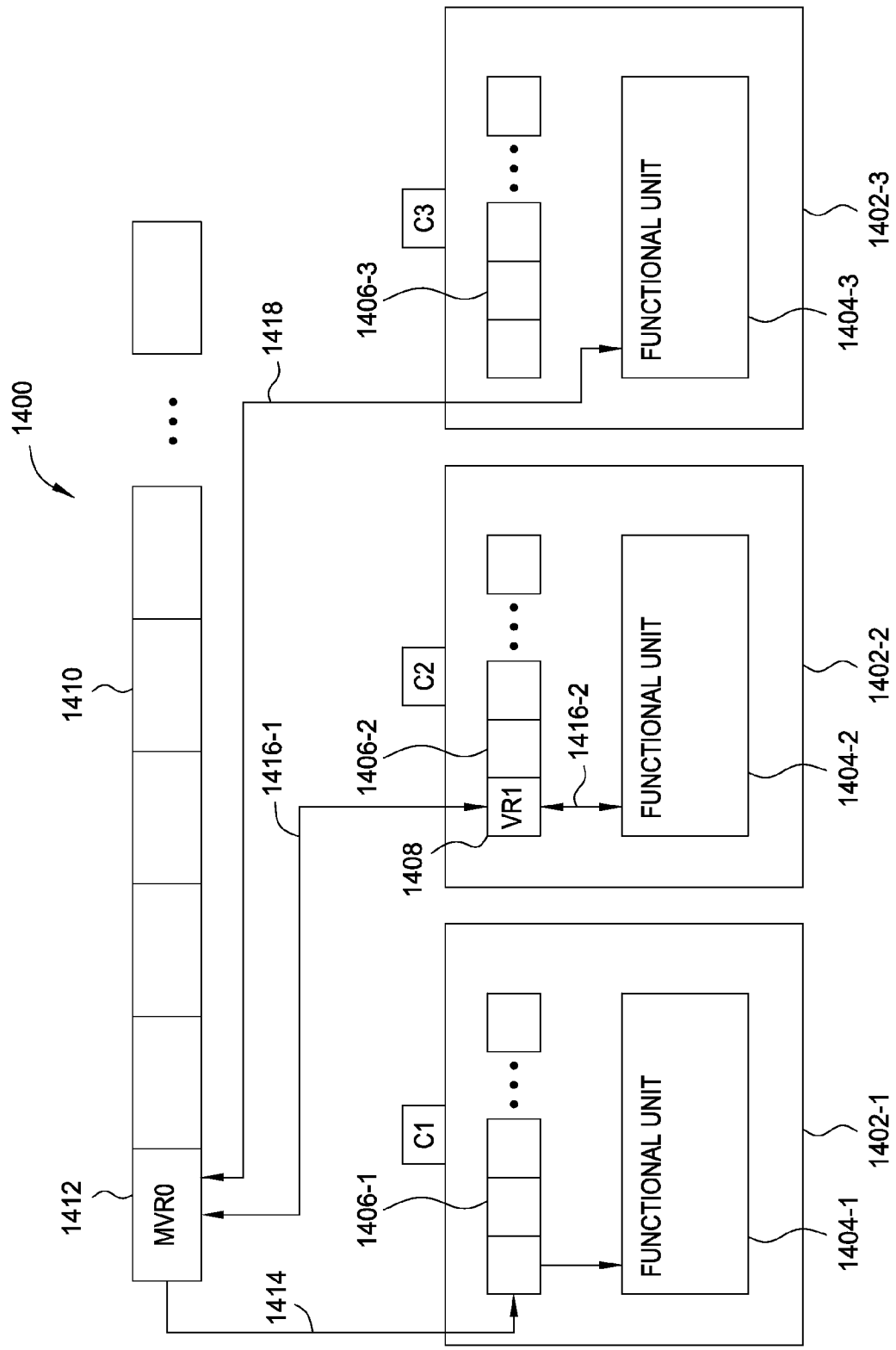
FIG. 14 is a block diagram of a multi-level register file hierarchy, according to one embodiment of the present invention.

As set forth below, FIGS. 11-12 illustrate a first example of how the techniques presented above in connection with FIGS. 5-10 can be applied. FIGS. 13-14 then illustrate a second example of how the techniques presented above in connection with FIGS. 5-10 can be applied.

FIG. 11 is a block diagram depicting example code segments both before and after virtual register partitioning, according to one embodiment of the present invention. FIG. 11 depicts code segments having instructions in a virtual instruction set that have been assigned to three different clusters, C1, C2, and C3. FIG. 11 depicts instructions that, prior to virtual register partitioning, access a virtual register, VR1, within a single live range, 1104. The instructions shown are either writes, depicted with symbol "W" or reads, depicted with symbol "R." Writes comprise any instruction that writes a value to VR1. Reads comprise any instruction that reads a value from VR1. Other instructions may be present, but are not described, and are depicted with the symbol "•".

Code segments 1102-1, 1102-2, and 1102-3 comprise instructions that have not been modified by virtual register partitioning. Instructions 1106 are assigned to cluster C1, instructions 1108 and 1110 are assigned to cluster C2, and instructions 1112 are assigned to cluster C3. All of instructions 1106, 1108, 1110, and 1112 access the same virtual register, register VR1. Moreover, a live range 1104 for virtual register VR1 is shown. The live range 1104 extends from instruction 1108, the first write of VR1, to instruction 1110, the last read of VR1.

Code segments 1122-1, 1122-2, and 1122-3 comprise instructions that have been modified by virtual register partitioning. Instructions 1126 are assigned to cluster C1, instructions 1128 and 1130 are assigned to cluster C2, and instructions 1132 are assigned to cluster C3. Instructions 1126, 1128, 1130, and 1132 correspond to instructions 1106, 1208, 1110, and 1112, respectively.

The owner cluster is cluster C1. In code segment 1102-1, there are three accesses to VR1 in the live range 1104. In code segment 1102-2, there are two accesses to VR1 in the live range 1104. In code segment 1102-3, there is one access to VR1 in the live range 1104. Instructions assigned to cluster C1, which are in code segment 1102-1, have the most accesses to VR1 in the live range 1104. Therefore, cluster C1 is the owner cluster of VR1 in live range 1104.

Code segment 1102-1 comprises read instructions 1106. Because cluster C1 is the owner cluster, reads assigned to cluster C1, comprising instructions 1106 which read from VR1, are not modified. VR1 is a local virtual register for its owner cluster, cluster C1. Thus read instructions 1126 are the same as read instructions 1106.

Code segment 1102-2 comprises write instructions 1108 and read instructions 1110. Write instructions 1128 are a modified version of write instruction 1108. Write instructions 1128 write a value to a new local virtual register, VR2. VR2 is a local virtual register that is local to cluster C2. Write instructions 1128 also copy the value written to VR2 into VR1, which is the local virtual register for cluster C1. Copying the value from VR2 into VR1 is not done directly, but is done through the use of a global virtual register, MVR0. Therefore, write instructions 1128 copy the value first to global virtual register MVR0 by the instruction "MOV MVR0, VR2" and then to the virtual register VR1 by the instruction "MOV VR1, MVR0." Read instructions 1130 read from the new virtual register, register VR2, which is the local virtual register for cluster C2.

Code segment 1102-3 comprises only one instruction— read instruction 1112. Because no other instructions in code segment 1102-3 utilize VR1 in live range 1104, read instruction 1132 reads directly from the global virtual register MVR0.

FIG. 12 is a block diagram of a multi-level register file hierarchy 1200, according to one embodiment of the present invention. FIG. 12 is discussed with reference to FIG. 11. Cluster C1 has local register file 1206-1, cluster C2 has local register file 1206-2, and cluster C3 has local register file 1206-3. Master register file 1210 is also present and accessible by clusters C1, C2, and C3. Local virtual register VR1 is assigned to physical register 1208-1 in cluster C1, local virtual register VR2 is assigned to a physical register 1208-2 in cluster C2, and global virtual register MVR0 is assigned to a physical register 1212 in the master register file 1210. Arrows 1214, 1216, and 1218 indicate accesses of values in physical registers by instructions 1126, 1128, 1130, and 1132 (in FIG. 11), assigned to clusters C1, C2, and C3.

Arrow 1214-1 corresponds to instructions 1126, which read the value stored in physical register 1208-1. Arrow 1216-1 corresponds to instructions 1128 and 1130. A value is written to the physical register 1208-2 in 1128 and read from physical register 1208-2 in 1130. Arrow 1216-2 corresponds to the copy instruction ("MOV") in instructions 1128 that copies the value from physical register 1208-2 to physical register 1212. Arrow 1216-3 corresponds to the first copy instruction in instructions 1128, which copies the value in physical register 121 to physical register 1208-1. Arrow 1218 corresponds to the read instruction 1132, which reads from physical register 1212.

FIG. 13 is a block diagram depicting example code segments both before and after virtual register partitioning, according to one embodiment of the present invention. FIG. 13 depicts code segments having instructions in a virtual instruction set that have been assigned to three different clusters, C1, C2, and C3. FIG. 13 focuses on instructions that, prior to virtual register partitioning, access a single virtual register, VR1, but within two different live ranges, 1304-1 and 1304-2. The instructions shown are either writes, depicted with symbol "W" or reads, depicted with symbol "R." Writes comprise any instruction that writes a value to VR1. Reads comprise any instruction that reads a value from VR1. Other instructions may be present, but are not described, and are depicted with the symbol "•".

Code segments 1302-1, 1302-2, and 1302-3 comprise instructions that have not been modified by virtual register partitioning. Instructions 1306 and 1308 are assigned to cluster C1, instructions 1310, 1312, and 1314 are assigned to cluster C2, and instructions 1316 and 1318 are assigned to cluster C3. All of instructions 1306, 1308, 1310, 1312, 1314, 1316, and 1318 access the same virtual register, register VR1. However, instructions 1306, 1310, and 1316 are in a first live range 1304-1, while instructions 1308, 1314, and 1318 are in a second live range 1304-2. There are two live ranges 1304-1, 1304-2 for virtual register VR1 because there are two different writes to VR1—instruction 1310 is a first write and 1318 is a second write. The first live range 1304-1 extends from the first write 1310 until the last read 1312 before the next write 1318, and the second live range 1304-2 extends from the second write 1318 until the last read 1308.

Code segments 1322-1, 1322-2, and 1322-3 comprise instructions that have been modified by virtual register partitioning. Instructions 1326 and 1328 are assigned to cluster C1, instructions 1330, 1332, and 1334 are assigned to cluster C2, and instructions 1336 and 1338 are assigned to cluster C3. Instructions 1326, 1328, 1330, 1332, 1334, 1336, and 1338 correspond to instructions 1306, 1308, 1310, 1312, 1314, 1316, and 1318, respectively.

For the first live range 1304-1, the owner cluster is cluster C2. In code segment 1302-1, there is one access to VR1 in the live range 1304-1. In code segment 1302-2, there are two accesses to VR1 in the live range 1304-1. In code segment 1302-3, there is one access to VR1 in the live range 1304-1. Instructions assigned to cluster C2 in the live range 1304-1, have the most accesses to VR1 in the live range 1304-1. Therefore, cluster C2 is the owner cluster of VR1 in live range 1304-1. In live range 1304-1, there is only one instruction that accesses VR1 assigned to cluster C1. Therefore, instruction 1326 reads directly from a global virtual register MVR0. In the live range 1304-1, the first instruction in cluster C2 is write instruction 1310. Therefore, instructions 1330 include a copy instruction to copy the value from VR1 to the global virtual register MVR0. Neither the write instruction in 1330 nor the read instruction 1332 is modified, as C2 is the owner cluster of VR1 in live range 1324-1. In the live range 1304-1, the only instruction assigned to cluster C3 is a read instruction. Therefore, instruction 1336 reads directly from the global virtual register MVR0.

For the second live range 1304-2, the owner cluster is cluster C2. In code segment 1302-1, there is one access to VR1 in the live range 1304-2. In code segment 1302-2, there are two accesses to VR1 in the live range 1304-2. In code segment 1302-3, there is one access to VR1 in the live range 1304-2. Instructions assigned to cluster C2 in the live range 1304-2, have the most accesses to VR1 in the live range 1304-1. Therefore, cluster C2 is the owner cluster of VR1 in live range 1304-2. In live range 1304-2, there is only one instruction that accesses VR1 assigned to cluster C1. Therefore, instruction 1328 reads directly from a global virtual register MVR0. In the live range 1304-2, the instructions in cluster C2 are both read instructions. Instructions 1334 are identical to instructions 1314, as C2 is the owner cluster of VR1 in live range 1324-2. In the live range 1304-2, the only instruction assigned to cluster C3 is a write instruction. Therefore, instructions 1338 write directly to the global virtual register MVR0, and then copy the value in MVR0 to VR1 for the owner cluster, cluster C2.

FIG. 14 is a block diagram of a multi-level register file hierarchy 1400, according to one embodiment of the present invention. FIG. 14 is discussed with reference to FIG. 13. Cluster C1 has local register file 1406-1, cluster C2 has local register file 1406-2, and cluster C3 has local register file 1406-3. Master register file 1410 is also present and accessible by clusters C1, C2, and C3. Local virtual register VR1 is assigned to physical register 1408 in cluster C1, and global virtual register MVR0 is assigned to a physical register 1412 in the master register file 1410. The same physical register 1408 in cluster C2 can be used for VR1 in both live ranges 1304-1 and 1304-2, because live ranges 1304-1 and 1304-2 do not overlap. Similarly, the same physical register 1412 in master register file 1410 can be used for MVR0 in both live ranges 1304-1 and 1304-2, because live ranges 1304-1 and 1304-2 do not overlap. Arrows 1414, 1416, and 1318 indicate accesses of values in physical registers by instructions 1326, 1328, 1330, 1332, 1334, 1336, and 1338 (in FIG. 11), assigned to clusters C1, C2, and C3.

Arrow 1414 corresponds to instructions 1326 and 1328, which both read the value stored in physical register 1412. Arrow 1416-1 corresponds to instructions 1330 and 1338, in which a value is copied from VR1 to MVR0, and in which a value is copied from MVR0 to VR1. Arrow 1416-2 corresponds to instructions 1330, which writes a value to VR1, and to instructions 1332 and 1334, which read the value from VR1. Arrow 1418 corresponds to instructions 1336 and 1338, which read a value from MVR0 and write a value to MVR0.

In sum, in accordance with the teachings presented herein, a compiler modifies program code that contains instructions to read data from and write data to virtual registers, to advantageously allocate virtual registers to physical registers in a multiple-level register file hierarchy. A multiple-level register file hierarchy comprises physical registers and may be implemented in hardware in a streaming multiprocessor having a plurality of clusters. Each cluster has one or more functional units for processing instructions. Further, each cluster has a low-level register file that is accessible directly only by the functional units in the processing cluster. A high-level register file is present in the streaming multiprocessor, and is accessible directly by all clusters.

The compiler analyzes program code having instructions that read from or write to virtual registers and allocates each of these instructions to a corresponding cluster. The compiler then determines virtual register live ranges and assigns owner clusters to each virtual register live range based on the number of virtual register accesses (reads or writes) by each cluster for each virtual register live range. The compiler then modifies instructions in the program code that access virtual registers such that values in the virtual registers can be stored in the low-level register file of the owner clusters. The compiler modifies instructions that are assigned to owner clusters and instructions that are assigned to non-owner clusters.

The compiler modifies instructions that are assigned to owner clusters such that values in virtual registers that are allocated to owner clusters are stored in "local virtual registers" that are local to the owner clusters. For instructions assigned to the owner clusters that write a value to the local virtual registers, the compiler inserts an additional instruction to copy the value from the local virtual register to a corresponding "global virtual register," such that the value in the local virtual register is accessible to non-owner clusters.

The compiler also modifies instructions that are assigned to non-owner clusters and that access values in a virtual register allocated to an owner cluster. Specifically, the compiler modifies instructions assigned to a non-owner cluster that read or write values in a local virtual register allocated to an owner cluster such that the instructions assigned to the non-owner cluster read or write values from the corresponding global virtual register instead.

Local virtual registers are later allocated to physical registers in low-level register files, while global virtual registers are later allocated to physical registers in high-level register files.

One advantage of the techniques provided herein is that the disclosed technique can configure instructions that access registers in a multiple-level register file hierarchy such that registers that are accessed often can be allocated to physical registers in a local register file.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The claimed invention is:

1. A method of allocating registers within a processing unit, the method comprising:
    assigning a plurality of instructions to a plurality of processing clusters, wherein each instruction is configured to access a first virtual register within a live range;
    determining which processing cluster in the plurality of processing clusters is an owner cluster for the first virtual register within the live range; and
    configuring a first instruction included in the plurality of instructions to access a first global virtual register, wherein the first instruction is assigned to the owner cluster.

2. The method of claim 1, wherein the first instruction is configured to implement a write operation to the first virtual register.

3. The method of claim 2, wherein:
    the first instruction has a corresponding location in a program control flow; and
    configuring the first instruction comprises:
        determining that an instruction assigned to a non-owner cluster is configured to implement a read operation from the first virtual register; and
        inserting a copy instruction after the corresponding location in the program control flow of the first instruction, wherein the copy instruction is configured to implement a copy operation that copies a value in the first virtual register to the first global virtual register.

4. The method of claim 1, wherein the first instruction is configured to implement a write operation to the first virtual register and is assigned to a non-owner cluster.

5. The method of claim 4, wherein:
    the first instruction has a corresponding location in a program control flow; and
    configuring the first instruction comprises:
        configuring the first instruction to implement a write operation to a second virtual register;
        inserting a first copy instruction after the corresponding location in the program control flow of the first instruction, wherein the first copy instruction is configured to implement a copy operation that copies a value in the second virtual register to the first global virtual register; and
        inserting a second copy instruction, after the first copy instruction, wherein the second copy instruction is configured to implement a copy operation that copies a value in the first global virtual register to the first virtual register.

6. The method of claim 1, wherein the first instruction is configured to implement a read operation from the first virtual register and is assigned to a non-owner cluster.

7. The method of claim 6, wherein configuring the first instruction comprises:
    determining that there is only one read instruction that is configured to implement a read operation from the first virtual register and that is assigned to the non-owner cluster in the live range; and
    configuring the first instruction to implement a read operation from the first global virtual register.

8. The method of claim 6, wherein:
    the first instruction has a corresponding location in a program control flow; and
    configuring the first instruction comprises:
        determining that there is a plurality of read instructions that are configured to read from the first virtual register in the live range and that are assigned to the non-owner cluster;
        inserting a first copy instruction before the corresponding location in the program control flow of the first instruction, wherein the first copy instruction is configured to copy a value in the first global register to a second virtual register; and
        configuring the plurality of read instructions to implement a read operation from the second virtual register.

9. The method of claim 1, further comprising allocating the first virtual register to a physical register in the owner cluster.

10. A non-transitory computer-readable medium storing instructions, that when executed by a processor, cause a computer system to allocate registers within a processing unit, by performing the steps of:
    assigning a plurality of instructions to a plurality of processing clusters, wherein each instruction is configured to access a first virtual register within a live range;
    determining which processing cluster in the plurality of processing clusters is an owner cluster for the first virtual register within the live range; and
    configuring a first instruction included in the plurality of instructions to access a first global virtual register, wherein the first instruction is assigned to the owner cluster.

11. The non-transitory computer-readable medium of claim 10, wherein the first instruction is configured to implement a write operation to the first virtual register.

12. The non-transitory computer-readable medium of claim 11, wherein:
    the first instruction has a corresponding location in a program control flow; and
    configuring the first instruction comprises:
        determining that an instruction assigned to a non-owner cluster is configured to implement a read operation from the first virtual register; and
        inserting a copy instruction after the corresponding location in the program control flow of the first instruction, wherein the copy instruction is configured to implement a copy operation that copies a value in the first virtual register to the first global virtual register.

13. The non-transitory computer-readable medium of claim 10, wherein the first instruction is configured to implement a write operation to the first virtual register and is assigned to a non-owner cluster.

14. The non-transitory computer-readable medium of claim 13, wherein:
    the first instruction has a corresponding location in a program control flow; and
    configuring the first instruction comprises:
        configuring the first instruction to implement a write operation to a second virtual register;
        inserting a first copy instruction after the corresponding location in the program control flow of the first instruction, wherein the first copy instruction is configured to implement a copy operation that copies a value in the second virtual register to the first global virtual register; and
        inserting a second copy instruction, after the first copy instruction, wherein the second copy instruction is configured to implement a copy operation that copies a value in the first global virtual register to the first virtual register.

15. The non-transitory computer-readable medium of claim 10, wherein the first instruction is configured to implement a read operation from the first virtual register and is assigned to a non-owner cluster.

16. The non-transitory computer-readable medium of claim 15, wherein configuring the first instruction comprises:
   determining that there is only one read instruction that is configured to implement a read operation from the first virtual register and that is assigned to the non-owner cluster in the live range; and
   configuring the first instruction to implement a read operation from the first global virtual register.

17. The non-transitory computer-readable medium of claim 15, wherein:
   the first instruction has a corresponding location in a program control flow; and
   configuring the first instruction comprises:
      determining that there is a plurality of read instructions that are configured to read from the first virtual register in the live range and that are assigned to the non-owner cluster;
      inserting a first copy instruction before the corresponding location in the program control flow of the first instruction, wherein the first copy instruction is configured to copy a value in the first global register to a second virtual register; and
      configuring the plurality of read instructions to implement a read operation from the second virtual register.

18. The non-transitory computer-readable medium of claim 10, further comprising allocating the first virtual register to a physical register in the owner cluster.

19. A computing device for allocating registers within a processing unit, the computing device comprising:
   a processor; and
   a memory coupled to the processor, wherein the memory includes a compiler having instructions that, when executed by the processor, cause the processor to:
      assign a plurality of instructions to a plurality of processing clusters, wherein each instruction is configured to access a first virtual register within a live range;
      determine which processing cluster in the plurality of processing clusters is an owner cluster for the first virtual register within the live range; and
      configure a first instruction included in the plurality of instructions to access a first global virtual register, wherein the first instruction is assigned to the owner cluster.

20. The computing device of claim 19, wherein:
   the first instruction is configured to implement a write operation to the first virtual register;
   the first instruction has a corresponding location in a program control flow; and
   configuring the first instruction comprises:
      determining that an instruction assigned to a non-owner cluster is configured to implement a read operation from the first virtual register; and
      inserting a copy instruction after the corresponding location in the program control flow of the first instruction, wherein the copy instruction is configured to implement a copy operation that copies a value in the first virtual register to the first global virtual register.

21. A non-transitory computer-readable medium storing instructions, that when executed by a processor, cause a computer system to allocate registers within a processing unit, by performing the steps of:
   assigning a plurality of instructions to a plurality of processing clusters, wherein each instruction is configured to access a first virtual register within a live range;
   determining which processing cluster in the plurality of processing clusters is an owner cluster for the first virtual register within the live range; and
   configuring a first instruction included in the plurality of instructions to access a first global virtual register configuring a first instruction included in the plurality of instructions to access a first global virtual register, wherein the first instruction is configured to implement a write operation to the first virtual register and is assigned to the owner cluster.

* * * * *